United States Patent [19]

DuBose, Jr.

[11] 3,946,492

[45] Mar. 30, 1976

[54] DIMENSION MEASURING MODULE

[75] Inventor: Reagan L. DuBose, Jr., Andover, Mass.

[73] Assignee: Hycor, Incorporated, Woburn, Mass.

[22] Filed: Mar. 14, 1974

[21] Appl. No.: 451,136

[52] U.S. Cl.............. 33/169 R; 33/174 L; 33/174 P; 33/174 PA; 33/174 PB
[51] Int. Cl.² ........................................... G01B 7/28
[58] Field of Search........... 33/169 R, 169 C, 169 F, 33/172 E, 147 N, 174 L, 174 P, 174 PC, 174 PA, 174 PB

[56] References Cited
UNITED STATES PATENTS

| | | | |
|---|---|---|---|
| 2,836,898 | 6/1958 | Possati et al...................... | 33/147 N |
| 3,571,934 | 3/1971 | Buck, Sr. ........................... | 33/169 R |

FOREIGN PATENTS OR APPLICATIONS

| | | | |
|---|---|---|---|
| 216,444 | 8/1941 | Switzerland....................... | 33/172 E |

Primary Examiner—Richard E. Aegerter
Assistant Examiner—Willis Little

[57] ABSTRACT

A dimension measuring module is provided based on frame means, one of the two major members of which is adapted for linear motion relative to the other. The movable frame member communicates with a transducer element adapted to provide a signal output which is responsive to the displacement of said frame member. Demand responsive means are provided for retracting and maintaining the movable frame member in a normally non-measuring rearward condition and for releasing said frame member for forward movement to a measuring condition.

7 Claims, 3 Drawing Figures

DIMENSION MEASURING MODULE

FIELD OF THE INVENTION AND PRIOR ART

The present invention relates generally to devices for measuring the physical dimensions of an object and is more particularly concerned with measuring devices comprising transducer means adapted to respond electrically to mechanical displacement units.

In U.S. Pat. No. 3,184,858, to H. B. Shaper, May 25, 1965, there is disclosed a height gage the operations of which are based on linear, essentially parallel movement of a displaceable frame member relative to a fixedly mounted base frame member. Said linear and parallel character of movement of the displaceable frame member is afforded by fixed spacing thereof from said base member by means of a pair of spaced parallel leaf springs interposed between the frame members. The frame members carry thereon cooperative elements of a mechanico-electrical transducer, the induced voltage output of which varies in response to displacement of the displaceable frame member.

Unfortunately, the height gage of Shaper is possessed of several disadvantages which, despite real attributes of compactness and accuracy of measurement, tend to mitigate against more extensive use thereof. Firstly, no provision is made in the Shaper gage to either retract the feeler tip from contact with an object to be measured or, for that matter, to bring the feeler tip into contact with the object. Accordingly, to serve these functions, it is necessary to either move the entire gage module or, alternatively, to move the object to be measured into and out of engagement with the feeler tip of the gage. This, of course, can often be found inconvenient. Perhaps of even greater importance, however, the failure of the Shaper gage to include provision for retraction of the feeler tip from the surface of the object to be measured without movement of the entire gage relative to the object mitigates strongly against employment of a plurality of such gages in a ganged array so as to provide the capability of rendering simultaneous multiple dimensional measurements of an object.

Another disadvantage of the Shaper gage resides in the failure thereof to provide means by which to control or adjust the bearing force of the feeler tip against the object to be measured. In many measuring applications it is important that said bearing force be very light, for instance on the order of two kilodynes or less, in order to avoid distortion of the object. Many wares of commerce such as thin-walled containers or cassettes for films or magnetic recording tape are produced or fabricated from light gauge metal or plastic. Such wares generally tend to be delicately constructed and are usually prone to significant distortions when subjected to even relatively light point loads thereagainst.

In accordance with the present invention, however, these problems have been substantially completely overcome.

OBJECTS OF THE INVENTION

It is a principal object of the invention to provide a novel dimension measuring device in modular form.

It is another object of the invention to provide a dimension measuring module comprising a displaceable feeler tip and self-contained means to retract said tip from and apply it to the surface of an object to be measured.

It is another object of the invention to provide a dimension measuring module adapted for use in ganged arrays thereof.

It is still another object of the invention to provide a dimension measuring module adapted for measuring delicate, readily distorted objects.

It is yet another object of the invention to provide a dimension measuring module comprising a displaceable feeler tip and wherein there is provided means to adjust the working force of said tip against an object to be measured.

It is still another object of the invention to provide a compact dimension measuring module having increased dynamic measuring capacity.

Other objects and advantages of the invention will, in part, be obvious and will, in part, appear hereinafter.

THE DRAWINGS

GENERAL DESCRIPTION OF THE INVENTION

The dimension measuring module of the invention generally comprises: (A) a framework comprising a fixed base frame member and an unfixed frame member adapted for substantially linear motion relative to said base frame member; (B) transducer means in operative communication with said unfixed frame member and adapted to respond to said relative motion thereof; (C) forward biasing means adapted to continuously urge said unfixed frame member forwardly; (D) rearward biasing means adapted to overcome said forward biasing means and to urge said unfixed frame member rearwardly to a retracted position; and release means adapted to overcome, on demand, the effect of said rearward biasing means, thereby to release said unfixed frame member for forward movement under the effect of said forward biasing means.

DETAILED DESCRIPTION OF THE INVENTION

Figure 1:
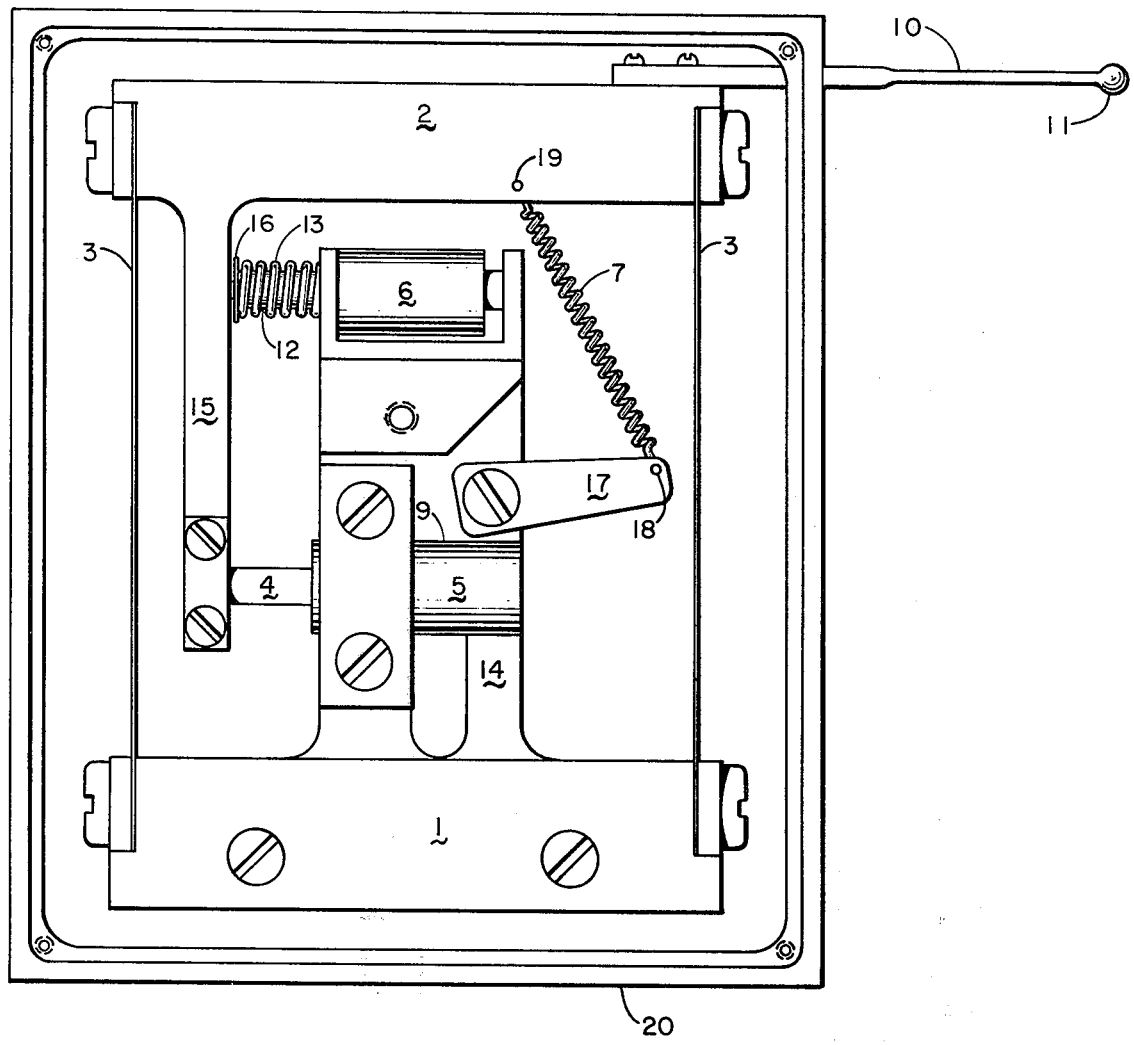
FIG. 1 is a schematic, diagrammatic side view of a dimension measuring module of the invention.

Referring now to FIG. 1, the dimension measuring module comprises a general housing 20 having secured thereto fixed base member 1. Completing the general framework assembly unfixed frame member 2 is held in spaced parallel relationship above fixed base frame member 1 by means of a pair of spaced apart parallel leaf springs 3. By this arrangement, therefore, unfixed frame member 2 is adapted for substantially linear and parallel forward and rearward displacement relative to base frame member 1. Secured to unfixed frame member 2 is feeler arm 10 which extends through aperture 22 of housing 20 and terminates on the exterior thereof in a suitably conformed feeler tip 11.

Biasing means adapted to continuously urge unfixed frame member 2 (and feeler tip 11) to the righthand or forward position is provided by an extension coil spring 7 which is affixed at one end to frame member 2 and at the other end to standoff 17. In turn, standoff 17 is secured to upright median leg 14 of fixed base member 1 in such a manner that the spring 7 attachment 18 thereof is displaced to the right of the no-load rest position of the corresponding spring attachment 19 of unfixed frame member 2. In view of the substantially frictionless nature of motion of the parallel framework arrangement, the biasing forces required to urge unfixed frame member 2 towards its forward position need generally be only slightly greater than the rearwardly directed forces of restitution generated by forward displacement of the parallel leaf springs 3 from their neutral or no-load positions. Accordingly, spring 7 can generally be of light construction thereby to minimize the point force of feeler tip 11 exerted against the surface of an object to be measured. Further, standoff 17 can be employed to adjust the tension of the spring 7. Thus, should it be desired to lessen the spring 7 force, standoff 17 may be rotated in a counterclockwise direction, thereby to reduce the extension of said spring 7 and to reduce the lateral distance between spring attachments 18 and 19.

In the device of FIG. 1 the means employed to rearwardly bias the frame member 2 to its rearward position and to release same for forward movement comprises a compression spring/solenoid arrangement. Solenoid 6 is secured to the medium upright leg 14 of fixed frame member 1. The shaft 12 of the solenoid 6 core extends rearwardly therefrom and tranverses the interior of a coil compression spring 13 whose dimensions and working characteristics are adapted to normally overcome the forward biasing force of spring 7 and to thereby cause and maintain retraction of frame member 2 to its rearward position by acting against depending leg 15 thereof. In turn, the operating characteristics of the solenoid 6 are such as to enable it to compress spring 13. The spring 13 is secured to shaft 12 and is placed in operative communication therewith by means of washer 16 which is pinned or otherwise secured to the end of shaft 12. Absent energizing of solenoid 6 the spring 13 acts against depending leg 15 of frame member 2 so as to overcome the forward biasing force of spring 7 and to urge and maintain said frame member (and feeler tip 11) in the retracted rearward position. However, by energizing solenoid 6 its shaft 12 is drawn into the core thereof, thereby compressing spring 13 and releasing frame member 2 to respond to the forwardly directed bias wrought thereon by spring 7. This, of course, brings feeler tip 11 forward to contact the surface of an object to be measured. Upon completion of the dimensional measurement cycle, solenoid 6 is deenergized and the compressed retraction spring 13 is freed to extend and displace unfixed frame member 2 rearwardly.

Measurement of an object is achieved through the cooperative relationship established between unfixed frame member 2 and a suitable transducer 5. The principal operating characteristic required of said transducer 5 is that it is capable of converting a finite mechanical displacement input into a finite and measurable output. In general, transducer means useful in the dimension measuring modules of the invention will be of a mechanico-electrical nature. In other words, suitable transducers will convert a mechanical displacement input thereinto into some type of an electrical response output, such as a change in voltage resistance, current, capacitance or the like. For instance, a specific transducer useful in the practice of the invention can comprise one or more photovoltaic cells which are illuminated by a steady state light source. Interrupter means can be affixed to the unfixed frame member 2 in such a manner that incident light on the photovoltaic cell(s) is either reduced or increased in response to displacement of feeler tip 11. The voltage output response of such an arrangement will, of course, vary in response to the amount of incident light viewed by the cell(s).

Generally preferred, however, are transducers 5 of the type known generally in the electronic field as linear variable differential transformers, hereinafter LVDTs. One such suitable LVDT is disclosed in detail in the Shaper patent discussed hereinbefore. However, it is generally preferred, in the interests of compactness and simplicity and to facilitate servicing or replacement, that there be employed a self-contained LVDT unit such as exemplified by the Pickering Model 7234 produced by Pickering and Company, Inc. Plainview, New York. Referring to FIG. 1, such LVDTs comprise a generally cylindrical body 9 containing the transformer field elements and a displaceable core element 4. The body element 9 of the LVDT transducer 5 is secured to the median upstanding leg 14 of fixed frame member 1 while the protruding end of the displaceable core element 4 is secured to depending leg 15 of unfixed frame member 2. During operations, the core element 4 moves substantially coaxially within the core of body element 9, thereby controlling the electrical output of the LVDT in response to displacement of frame member 2. Since there is normally no contact between core element 4 and body element 9, the essentially frictionless nature of the parallel frame member arrangement is preserved and the need for relatively more forceful forward biasing means is avoided.

Figure 2:
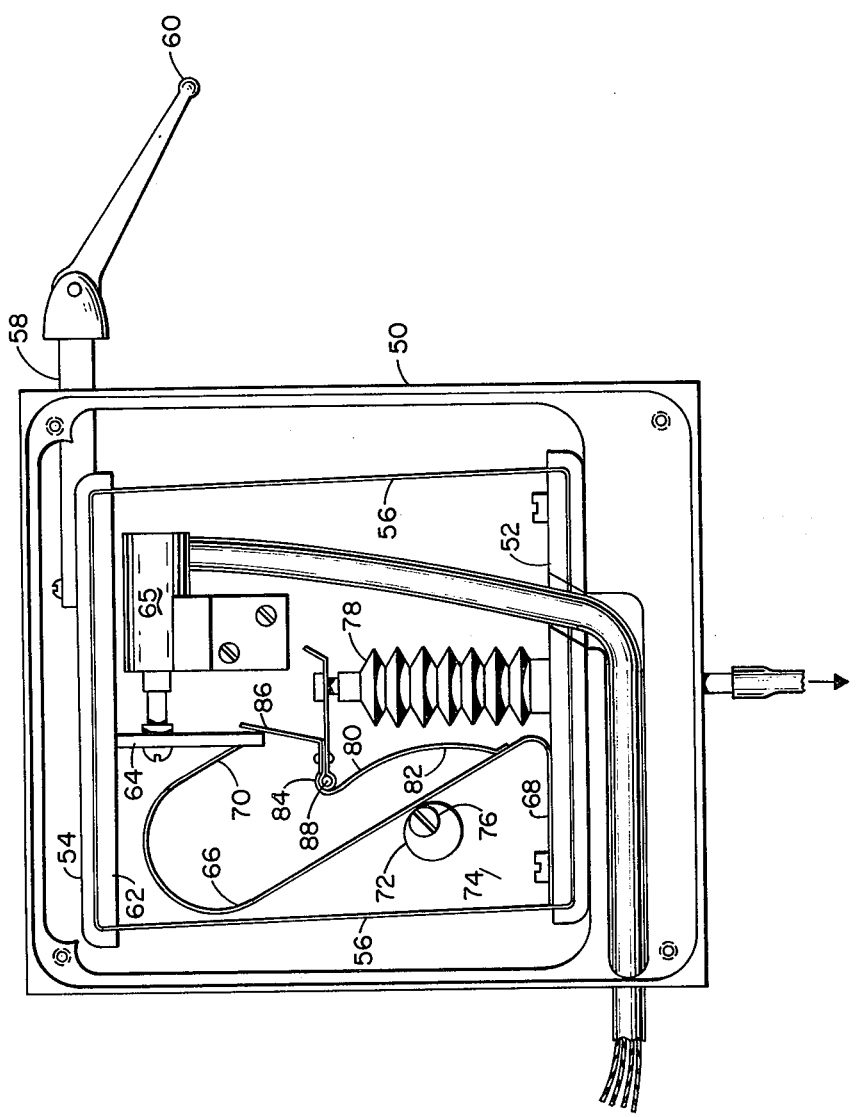
FIG. 2 is a schematic, diagrammatic side view of another embodiment of the invention.

In FIG. 2 there are shown several preferred embodiments of the dimension measuring modules of the invention. Referring now to said FIG. 2, it will be seen that the measuring module again comprises a general enclosure 50 and a framework adapted for substantially linear motion of an unfixed member thereof, said framework comprising a fixed base frame member 52, an unfixed frame member 54, a pair of parallel leaf spring 56 and a feeler arm 58 attached to said unfixed frame member 54. Arm 58 terminates on the exterior of enclosure 50 in a suitable feeler tip 60. Secured to the underside of unfixed frame member 54 is a "T"-shaped member 62, the base leg 64 of which depends perpendicularly from frame member 54 and which leg 64 is in operative communication with transducer 65.

The forward biasing means for unfixed frame member 54 comprises a leaf or wire spring 66 having the general shape of a shepherd's staff, the staff end 68 of which is secured to fixed frame member 52 and the bow end 70 of which butts and acts against the back surface of depending base leg 64 of "T" member 62, thereby to urge frame member 54 to its forward position. It is in the nature of a spring conforming to the shepherd's staff shape depicted to provide substantially more constant biasing force over its range of displacement than does a coil or straight leaf spring arrangement. Preferably, the spring 66 will additionally be provided with a tension adjustment in the form of an eccentric cam 72 abutting the rear surface of the staff portion of the spring 66. Said eccentric cam 72 is rotatably mounted to the sidewall 74 of enclosure 50 and is further desirably provided with means, such as slot 76, for convenient adjustment thereof while the cover plate (not shown) of enclosure 50 is in place.

The demand responsive retraction/release arrangement of the dimension measuring module of FIG. 2 comprises a pneumatic bellows 78 and a leaf spring 80.

Said lever spring 80 comprises a lower arm 82, pivot point or fulcrum 84 and an upper arm 86. The free end of lower arm 82 butts against the lower end of the staff portion of spring 66. The pivot point 84 comprises a loop of the leaf spring 80 material about a pivot pin 88 which extends perpendicularly from sidewall 74 of enclosure 50. Upper arm 86 extends upwardly from the level of pivot point 84 so as to engage the front surface of depending leg base 64 of "T"-shaped member 62. The precise dimensions and shape of lever spring 80 are adapted to normally overcome the forwardly directed force of spring 66 and to cause unfixed frame member 54 to be retracted in its rearward resting state.

Pneumatic bellows 78 is secured at one end thereof to fixed frame member 52 and is adapted for fluid communication with an external vacuum source (not shown). The other end of bellows 78 is mechanically secured in suitable fashion to the upper arm 86 of lever spring 80. Upon demand, a vacuum is applied to the interior of belows 78, thereby contracting the length thereof and causing arm 86 of spring 80 to pivot out of engagement with depending leg 64 of "T"-member 62. This action, of course, frees frame member 54 to be moved forwardly under the influence of spring 66, thereby to bring feeler tip 60 into contact with an object to be measured.

The pneumatic demand responsive retraction/release arrangement described is possessed of several advantages over the spring/solenoid system of FIG. 1. Firstly, said pneumatic system can normally be more precisely controlled and can thus generally provide for a more gentle release and retraction of the dynamic measuring elements of the device than can the extremely rapid, nearly instantaneous release characteristics attendant conventional solenoid operations. Secondly, the pneumatic system provides substantial convenience when employing a plurality of the measuring modules. For instance, a plurality of the modules bearing the pneumatic release system described can generally be rapidly and easily hooked up to a common pneumatic manifold for simultaneous operations.

Figure 3:
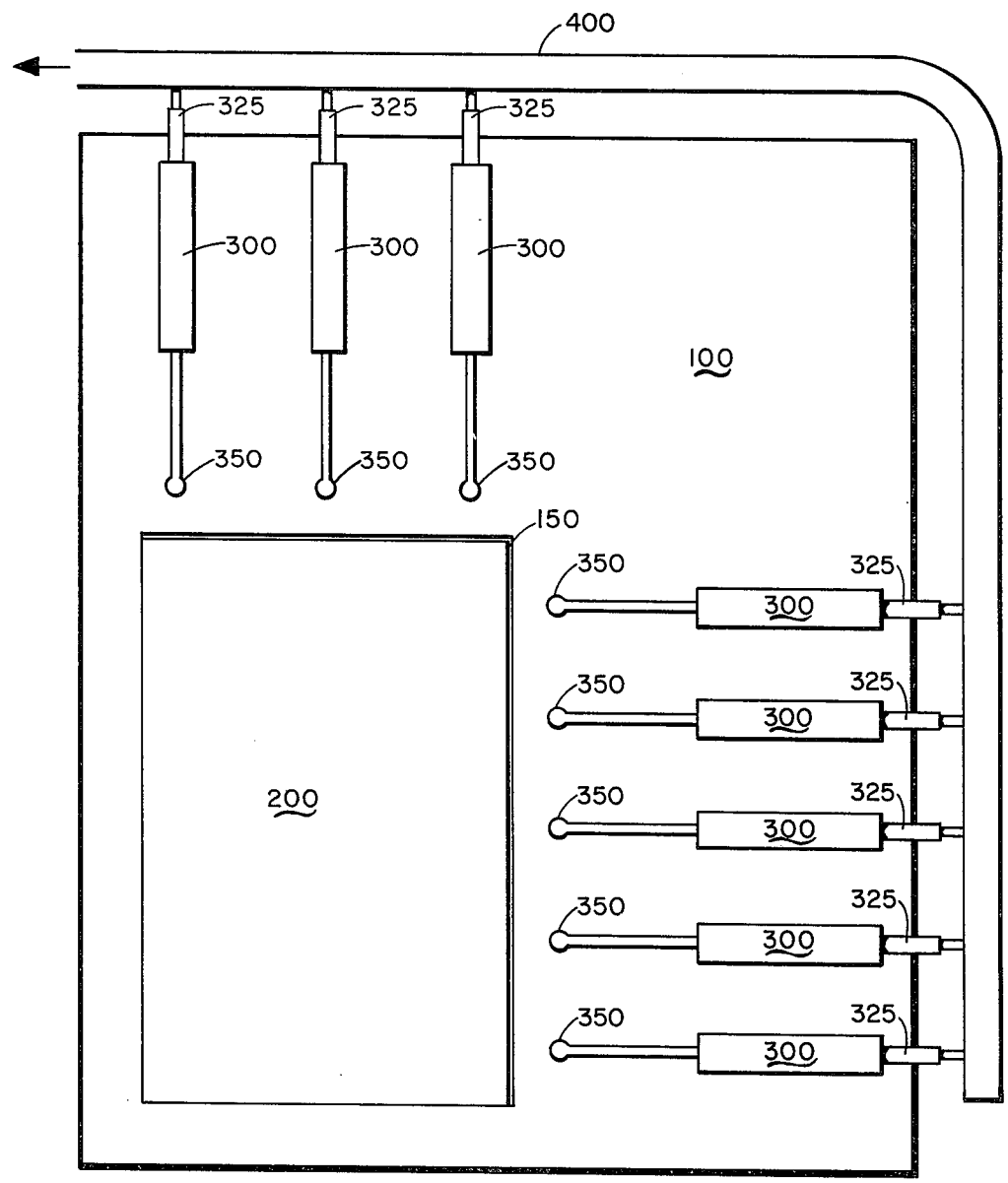
FIG. 3 is a schematic plan view of an object jig having a plurality of the measuring modules of the invention mounted thereon in ganged array.

Such a plural module arrangement is depicted schematically in FIG. 3 wherein there is shown a jig 100 having a jig well 150 wherein there is contained an object 200 to be measured. A plurality of dimension measuring modules 300 bearing the vacuum release arrangement of the type shown in FIG. 2 and described hereinbefore are secured to the jig 100 at fixed distance from the perimeter of jig well 150. By virtue of the normally retracted condition of each of the feeler tips 350 of modules 300, loading of the object 200 into jig well 150 is facilitated. Each of the modules 300 is connected through a suitable vacuum line 325 to a common vacuum supply manifold 400. By application of an appropriate vacuum in said supply manifold 400, the feeler tips 350 of modules 300 are substantially simultaneously released for forward movement to contact their respective measurement loci on the jigged object 200, thereby to provide substantially simultaneous plural dimensional measurements thereof. Upon completion of the measuring cycle, the vacuum is released from manifold 400, thereby allowing retraction of the feeler tips 350 and providing for facile removal of the object 200 from the jig well without interferences from tips 350.

Obviously, many changes may be made in the above description without departing from the scope of the invention. For instance, the vacuum release arrangement of FIG. 2 may be readily converted to pneumatic pressure operations by rearrangement of bellow 78 so as to be secured to lower arm 82 of lever leaf spring 80 rather than to the upper arm 86 as specifically shown. Similarly, the bellows 78 may be positioned above rather than below said upper arm 86. In accordance with either of these last-mentioned arrangements, release of the unfixed frame member for forward displacement will be achieved by pressuring the bellows 78 rather than by applying a vacuum thereto. Too, a suitable substitute for bellows 78 may take the form of pneumatic piston/cylinder arrangement.

The biasing elements for forward and rearward biasing of the unfixed frame member may also take the form of elastomeric bands, cables and the like instead of the metallic spring element explicitly disclosed hereinbefore.

Accordingly, while I have disclosed and described my invention in detail with respect to certain specific embodiments thereof for purposes of illustration, it will, of course, be understood that the invention is not to be construed as limited thereby, since it is apparent that the construction principles herein disclosed are susceptible of numerous embodiments, permutations and equivalents. Modifications may, therefore, be made in the structural arrangements and in the instrumentalities described hereinabove without departing from the essential spirit and scope of my invention as set forth in the appended claims.

The embodiments of the invention in which an exclusive privilege is claimed are defined as follows:

1. In a dimension measuring module of the class comprising a fixed frame member, and unfixed frame member spaced from and maintained in substantially parallel relationship with the fixed frame member by means of a pair of parallel spaced apart leaf springs connected therebetween and transducer means in operative communications with the unfixed frame member, the improvement which comprises, in combination:

A. means acting upon the unfixed frame member to continuously urge the unfixed frame member forwardly to a measuring position;
   B. means in communication with and acting upon the unfixed frame member to overcome the forwardly directed action of the means of (A) and to resiliently urge the unfixed frame member rearwardly to a nonmeasuring position; and
   C. means to disengage, on command, the means of (B) from communication with the unfixed frame member, thereby to allow forward displacement of the unfixed frame member under the influence of the means of (A).

2. The dimension measuring module of claim 1 wherein the means of (B) is a lever in rearwardly and resiliently biased communication with the unfixed frame member and the means of (C) is a pneumatically operated means in communication with the lever.

3. The dimension measuring module of claim 2 wherein the pneumatically operated means of (C) is a vacuum operated bellows.

4. The dimension measuring module of claim 1 wherein the transducer is an LVDT.

5. The dimension measuring module of claim 1 wherein the means of (B) is a spring and the means of (C) is a solenoid in communication with the spring of (B) and operable to disengage the spring from communication with the unfixed frame member.

6. The dimension measuring module of claim 1 wherein there is additionally provided means to adjust the working force of the means of (A).

7. The dimension measuring module of claim 1 wherein the means of (A) is a spring having the shape of a shepherd's staff, the staff end of which is secured to the fixed frame member and the bow end of which acts against the unfixed frame member.

* * * * *